United States Patent
Wang et al.

(10) Patent No.: US 8,861,635 B2
(45) Date of Patent: Oct. 14, 2014

(54) SETTING RADIO FREQUENCY (RF) BEAMFORMER ANTENNA WEIGHTS PER DATA-STREAM IN A MULTIPLE-INPUT-MULTIPLE-OUTPUT (MIMO) SYSTEM

(71) Applicant: Magnolia Broadband Inc., Englewood, NJ (US)

(72) Inventors: Sherwin J. Wang, Towaco, NJ (US); Phil F. Chen, Denville, NJ (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 14/065,182

(22) Filed: Oct. 28, 2013

(65) Prior Publication Data

US 2014/0051377 A1 Feb. 20, 2014

Related U.S. Application Data

(63) Continuation-in-part of application No. 13/630,156, filed on Sep. 28, 2012.

(60) Provisional application No. 61/652,743, filed on May 29, 2012, provisional application No. 61/657,999, filed on Jun. 11, 2012, provisional application No. 61/658,015, filed on Jun. 11, 2012, provisional application No. 61/665,592, filed on Jun. 28, 2012.

(51) Int. Cl.
*H04B 7/02* (2006.01)

(52) U.S. Cl.
USPC .......................... 375/267; 375/260; 375/259

(58) Field of Classification Search
CPC .................................................. H04B 7/0408
USPC .......................................... 375/267, 260, 259
See application file for complete search history.

(56) References Cited

U.S. PATENT DOCUMENTS

| | | | |
|---|---|---|---|
| 4,044,359 A | 8/1977 | Applebaum et al. | |
| 4,079,318 A | 3/1978 | Kinoshita | |
| 4,359,738 A | 11/1982 | Lewis | |
| 4,540,985 A | 9/1985 | Clancy et al. | |
| 4,628,320 A | 12/1986 | Downie | |
| 5,162,805 A | 11/1992 | Cantrell | |

(Continued)

FOREIGN PATENT DOCUMENTS

| | | |
|---|---|---|
| EP | 1 867 177 | 5/2010 |
| EP | 2 234 355 | 9/2010 |

(Continued)

OTHER PUBLICATIONS

Office Action issued by the United States Patent and Trademark Office for U.S. Appl. No. 13/630,146 dated Jan. 22, 2013.

(Continued)

*Primary Examiner* — Michael Neff
(74) *Attorney, Agent, or Firm* — Pearl Cohen Zedek Latzer Baratz LLP

(57) ABSTRACT

A system and a closed form method of optimizing a set of receive beamformers' weights, each feeding one of N multi-layer MIMO receiving system wherein the beamformers have a pool of M receive antennas wherein M is greater than N. Each beamformer is tuned to optimize one data stream, where selection of antennas per beamformer may be done out of a pool of antennas, and mapping of a given beamformer to a data stream is optimized per certain performance metrics.

12 Claims, 4 Drawing Sheets

(56) References Cited

U.S. PATENT DOCUMENTS

| | | |
|---|---|---|
| 5,363,104 A | 11/1994 | Richmond |
| 5,444,762 A | 8/1995 | Frey et al. |
| 5,732,075 A | 3/1998 | Tangemann et al. |
| 5,915,215 A | 6/1999 | Williams et al. |
| 5,940,033 A | 8/1999 | Locher et al. |
| 6,018,317 A | 1/2000 | Dogan et al. |
| 6,046,655 A | 4/2000 | Cipolla |
| 6,101,399 A | 8/2000 | Raleigh et al. |
| 6,215,812 B1 | 4/2001 | Young et al. |
| 6,226,507 B1 | 5/2001 | Ramesh et al. |
| 6,230,123 B1 | 5/2001 | Mekuria et al. |
| 6,297,772 B1 | 10/2001 | Lewis |
| 6,321,077 B1 | 11/2001 | Saitoh et al. |
| 6,377,783 B1 | 4/2002 | Lo et al. |
| 6,584,115 B1 | 6/2003 | Suzuki |
| 6,697,633 B1 | 2/2004 | Dogan et al. |
| 6,834,073 B1 | 12/2004 | Miller et al. |
| 6,927,646 B2 | 8/2005 | Niemi |
| 6,975,582 B1 | 12/2005 | Karabinis et al. |
| 6,987,958 B1 | 1/2006 | Lo et al. |
| 7,068,628 B2 | 6/2006 | Li et al. |
| 7,177,663 B2 | 2/2007 | Axness et al. |
| 7,257,425 B2 | 8/2007 | Wang et al. |
| 7,299,072 B2 | 11/2007 | Ninomiya |
| 7,392,015 B1 | 6/2008 | Farlow et al. |
| 7,499,109 B2 | 3/2009 | Kim et al. |
| 7,606,528 B2 | 10/2009 | Mesecher |
| 7,719,993 B2 | 5/2010 | Li et al. |
| 7,742,000 B2 | 6/2010 | Mohamadi |
| 7,769,107 B2 | 8/2010 | Sandhu et al. |
| 7,898,478 B2 | 3/2011 | Niu et al. |
| 7,970,366 B2 | 6/2011 | Arita et al. |
| 8,078,109 B1 | 12/2011 | Mulcay |
| 8,115,679 B2 | 2/2012 | Falk |
| 8,155,613 B2 | 4/2012 | Kent et al. |
| 8,280,443 B2 | 10/2012 | Tao et al. |
| 8,294,625 B2 | 10/2012 | Kittinger et al. |
| 8,306,012 B2 | 11/2012 | Lindoff et al. |
| 8,315,671 B2 | 11/2012 | Kuwahara et al. |
| 8,369,436 B2 | 2/2013 | Stirling-Gallacher |
| 8,509,190 B2 | 8/2013 | Rofougaran |
| 8,520,657 B2 | 8/2013 | Rofougaran |
| 8,526,886 B2 | 9/2013 | Wu et al. |
| 8,599,955 B1 | 12/2013 | Kludt et al. |
| 8,599,979 B2 | 12/2013 | Farag et al. |
| 8,649,458 B2 | 2/2014 | Kludt et al. |
| 2001/0029326 A1 | 10/2001 | Diab et al. |
| 2001/0038665 A1 | 11/2001 | Baltersee et al. |
| 2002/0051430 A1 | 5/2002 | Kasami et al. |
| 2002/0065107 A1 | 5/2002 | Harel et al. |
| 2002/0085643 A1 | 7/2002 | Kitchener et al. |
| 2002/0107013 A1 | 8/2002 | Fitzgerald |
| 2002/0115474 A1 | 8/2002 | Yoshino et al. |
| 2003/0114162 A1 | 6/2003 | Chheda et al. |
| 2003/0153322 A1 | 8/2003 | Burke et al. |
| 2003/0203717 A1 | 10/2003 | Chuprun et al. |
| 2004/0056795 A1 | 3/2004 | Ericson et al. |
| 2004/0121810 A1 | 6/2004 | Goransson et al. |
| 2004/0125899 A1 | 7/2004 | Li et al. |
| 2004/0125900 A1 | 7/2004 | Liu et al. |
| 2004/0166902 A1 | 8/2004 | Castellano et al. |
| 2004/0228388 A1 | 11/2004 | Salmenkaita |
| 2004/0235527 A1 | 11/2004 | Reudink et al. |
| 2005/0068230 A1 | 3/2005 | Munoz et al. |
| 2005/0068918 A1 | 3/2005 | Mantravadi et al. |
| 2005/0075140 A1 | 4/2005 | Famolari |
| 2005/0129155 A1 | 6/2005 | Hoshino |
| 2005/0147023 A1 | 7/2005 | Stephens et al. |
| 2005/0245224 A1 | 11/2005 | Kurioka |
| 2005/0250544 A1 | 11/2005 | Grant et al. |
| 2005/0287962 A1 | 12/2005 | Mehta et al. |
| 2006/0041676 A1 | 2/2006 | Sherman |
| 2006/0094372 A1 | 5/2006 | Ahn et al. |
| 2006/0135097 A1 | 6/2006 | Wang et al. |
| 2006/0227854 A1 | 10/2006 | McCloud et al. |
| 2006/0264184 A1 | 11/2006 | Li et al. |
| 2006/0270343 A1 | 11/2006 | Cha et al. |
| 2006/0271969 A1 | 11/2006 | Takizawa et al. |
| 2006/0285507 A1 | 12/2006 | Kinder et al. |
| 2007/0076675 A1 | 4/2007 | Chen |
| 2007/0093261 A1 | 4/2007 | Hou et al. |
| 2007/0152903 A1 | 7/2007 | Lin et al. |
| 2007/0223380 A1 | 9/2007 | Gilbert et al. |
| 2008/0043867 A1 | 2/2008 | Blanz et al. |
| 2008/0051037 A1 | 2/2008 | Molnar et al. |
| 2008/0144737 A1 | 6/2008 | Naguib |
| 2008/0165732 A1 | 7/2008 | Kim et al. |
| 2008/0238808 A1 | 10/2008 | Arita et al. |
| 2008/0280571 A1 | 11/2008 | Rofougaran et al. |
| 2008/0285637 A1 | 11/2008 | Liu et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0154419 A1 | 6/2009 | Yoshida et al. |
| 2009/0190541 A1 | 7/2009 | Abedi |
| 2009/0268616 A1 | 10/2009 | Hosomi |
| 2009/0322610 A1 | 12/2009 | Hants et al. |
| 2009/0322613 A1 | 12/2009 | Bala et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0117890 A1 | 5/2010 | Vook et al. |
| 2010/0135420 A1 | 6/2010 | Xu et al. |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0234071 A1 | 9/2010 | Shabtay et al. |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0105036 A1 | 5/2011 | Rao et al. |
| 2011/0150050 A1 | 6/2011 | Trigui et al. |
| 2011/0150066 A1 | 6/2011 | Fujimoto |
| 2011/0163913 A1 | 7/2011 | Cohen et al. |
| 2011/0205883 A1 | 8/2011 | Mihota |
| 2011/0228742 A1 | 9/2011 | Honkasalo et al. |
| 2011/0249576 A1 | 10/2011 | Chrisikos et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0064838 A1 | 3/2012 | Miao et al. |
| 2012/0076028 A1 | 3/2012 | Ko et al. |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0218962 A1 | 8/2012 | Kishiyama et al. |
| 2012/0220331 A1 | 8/2012 | Luo et al. |
| 2012/0230380 A1 | 9/2012 | Keusgen et al. |
| 2012/0251031 A1 | 10/2012 | Suarez et al. |
| 2012/0270544 A1 | 10/2012 | Shah |
| 2012/0314570 A1 | 12/2012 | Forenza et al. |
| 2013/0010623 A1 | 1/2013 | Golitschek |
| 2013/0023225 A1 | 1/2013 | Weber |
| 2013/0051283 A1 | 2/2013 | Lee et al. |
| 2013/0070741 A1 | 3/2013 | Li et al. |
| 2013/0079048 A1 | 3/2013 | Cai et al. |
| 2013/0094621 A1 | 4/2013 | Luo et al. |
| 2013/0101073 A1 | 4/2013 | Zai et al. |
| 2013/0156120 A1 | 6/2013 | Josiam et al. |
| 2013/0170388 A1 | 7/2013 | Ito et al. |

(56) References Cited

U.S. PATENT DOCUMENTS

| | | |
|---|---|---|
| 2013/0208619 A1 | 8/2013 | Kudo et al. |
| 2013/0223400 A1 | 8/2013 | Seo et al. |
| 2013/0242976 A1 | 9/2013 | Katayama et al. |
| 2013/0272437 A1 | 10/2013 | Eidson et al. |
| 2013/0331136 A1 | 12/2013 | Yang et al. |

FOREIGN PATENT DOCUMENTS

| | | |
|---|---|---|
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.

SETTING RADIO FREQUENCY (RF) BEAMFORMER ANTENNA WEIGHTS PER DATA-STREAM IN A MULTIPLE-INPUT-MULTIPLE-OUTPUT (MIMO) SYSTEM

CROSS-REFERENCE TO RELATED APPLICATIONS

This application is a continuation-in-part application of U.S. patent application Ser. No. 13/630,146, filed on Sep. 28, 2012, which claims the benefit of U.S. Provisional Patent Application No. 61/652,743, filed on May 29, 2012, U.S. Provisional Patent Application No. 61/657,999, filed on Jun. 11, 2012, U.S. Provisional Patent Application No. 61/658,015, filed on Jun. 11, 2012, and U.S. Provisional Patent Application No. 61/665,592, filed on Jun. 28, 2012, all of which are incorporated herein by reference in their entirety.

FIELD OF THE INVENTION

The present invention relates generally to the field of radio frequency (RF) multiple-input-multiple-output (MIMO) systems and more particularly to systems and methods for RF MIMO systems using RF beamforming and/or digital signal processing, to augment the receiver performance.

BACKGROUND OF THE INVENTION

Prior to setting forth a short discussion of the related art, it may be helpful to set forth definitions of certain terms that will be used hereinafter.

The term "MIMO" as used herein, is defined as the use of multiple antennas at both the transmitter and receiver to improve communication performance (measured by pre-defined metrics known in the art). MIMO offers significant increases in data throughput and link range without additional bandwidth or increased transmit power. It achieves this goal by spreading the transmit power over the antennas to achieve spatial multiplexing that improves the spectral efficiency (more bits per second per Hz of bandwidth) or to achieve a diversity gain that improves the link reliability (reduced fading), or increased antenna directivity. Several MIMO receiving schemes are known to be used such as channel estimation and blind scan.

The term "beamforming" sometimes referred to as "spatial filtering" as used herein, is a signal processing technique used in antenna arrays for directional signal transmission or reception. This is achieved by combining elements in the array in such a way that signals at particular angles experience constructive interference while others experience destructive interference. Beamforming can be used at both the transmitting and receiving ends in order to achieve spatial selectivity.

The term "beamformer" as used herein refers to RF circuitry that implements beamforming and usually includes a combiner and may further include switches, controllable phase shifters, and in some cases amplifiers and/or attenuators. For the sake of simplicity, in the following text, any referral to "phase" may also include a "gain" or "attenuation" of the signal.

The term "look through" method as used herein refers to receivers that use a single receive antenna in each beamformer at a time in order to carry out channel estimation and obtain the channel information (components of H being the channel matrix).

The term "Receiving Radio Distribution Network" or "Rx RDN" or simply "RDN" as used herein is defined as a group of beamformers as set forth above.

The term "hybrid MIMO RDN" as used herein is defined as a MIMO system that employs two or more antennas per channel (N is the number of channels and M is the total number of antennae and M>N). This architecture employs a beamformer for each channel so that two or more antennas are combined for each radio circuit that is connected to each one of the channels.

In hybrid MIMO RDN receiving systems, when the phases of the received signals from each antenna are properly adjusted or tuned with respect to one another, the individual signals may be combined and result in an improved performance of the receiving system.

FIG. 1 shows a non-limiting example of a standard 2×2 MIMO radio 20 with two antennas A and B communicating with a base station 10 having two transmit antennas radiating Tx1 and Tx2 according to the prior art. For the rank 2 (i.e., MIMO rank>1 in general), each transmit antenna will transmit portion of the two data streams with pre-coding weight W. While each receive antenna A and B receives both data streams, the baseband processes channel estimation separates them using the knowledge of pre-coding weight. It is noted that the receiver always knows the transmit pre-coding weight W, either by its own feedback to transmitter or by being informed by the transmitter in advance. The pre-coding weight W is configured to de-correlate the data streams by forming two orthogonal beams: one for each data stream, at the receiver.

SUMMARY

According to some embodiments of the present invention, the challenge of selecting the phases in the receive antennas coupled to the beamformers in the hybrid MIMO RDN architecture, are addressed in order to maximize the signal for each data stream directly by an individual beamformer or to maximize the signal for all data streams collectively, in an architecture in which the number of receive antennas (M) is greater than the number of transmit antennas (N). According to some embodiments of the present invention, the channel estimation information of individual Rx antenna (e.g., via look through) and the knowledge of pre-coding weight W may be used in order to tune the receive antennas such that each beamformer maximizes the received power of one particular data stream in the full rank MIMO operation. The phase settings Q for all receive antennas may be obtained for each beamformer-data stream mapping configurations. For example, for receive antenna i in beamformer j, in order to maximize the received power of data stream n, the phase for the receive antenna can be set as $\Phi_{ji} = 360° - \text{phase of } (\Sigma_{l=1}^{N} h_{jl}^* w_{ln})i$, wherein "i" indicates the data of h*w which is obtained during the "look through" using antenna i, and "l" indicates transmit antenna, l=1, 2 ... N.

According to some embodiments of the present invention, a method to select the optimal beamformer-data stream mapping configuration is provided herein. An embodiment of the method is based on seeking the maximum total received power for all data streams (i.e., the maximum sum of squared singular values of the transmission matrix: Q*H*W).

According to some other embodiments of the present invention, a method to select the optimal beamformer-data stream mapping configuration is provided herein. An embodiment of the method is based on seeking the most uniformly distributed gains for all data streams (i.e., minimal cond (Q*H*W) which is the ratio of the maximum singular value to the minimum singular value of the transmission matrix.

Another embodiment is based on seeking the overall MIMO capacity optimization by selecting the beamformer-data stream mapping configuration that has cond(Q*H*W) below a certain threshold (e.g., 2) and the maximum received power among the mapping configurations.

According to some other embodiments, the MIMO Rx RDN system may have switch matrix to pool the receive antennas among beamformers. The optimization computation in the aforementioned methods may be applied to the pooled antenna configurations to generalize the optimization process and may get the better optimization results.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

Figure 1:
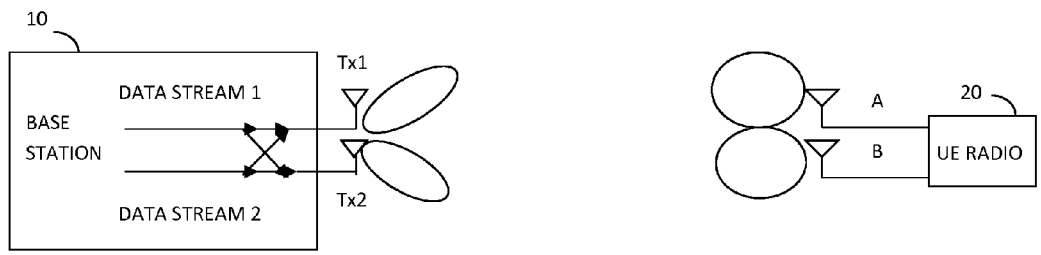
FIG. 1 is a high level block diagram illustrating a system according to some embodiments of the prior art.

The drawings together with the following detailed description make the embodiments of the invention apparent to those skilled in the art.

DETAILED DESCRIPTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Figure 2:
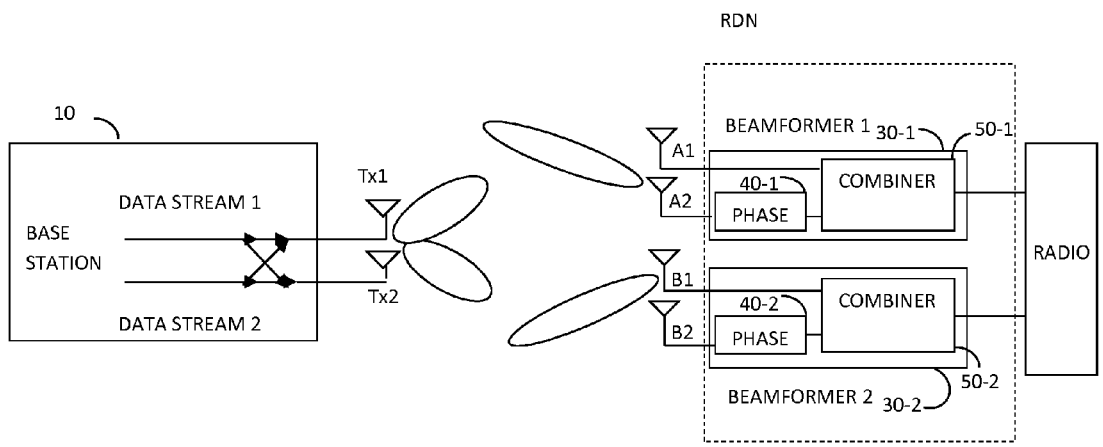
FIG. 2 is a high level block diagram illustrating an exemplary 2×2 MIMO system augmented with an Rx RDN according to one embodiment of the invention.

FIG. 2 shows an example of a 2×2 MIMO RDN architecture in which each receive antenna as shown in FIG. 1 such as A1, and B1 are enhanced by adding another antenna, A2 and B2 respectively, thus providing reception by four antennas instead of two. The hybrid MIMO RDN architecture may further include beamformer 1 30-1 and beamformer 2 30-2 each including phase shifters 40-1 and 40-2 and combiners 50-1 and 50-2 respectively.

Figure 3:
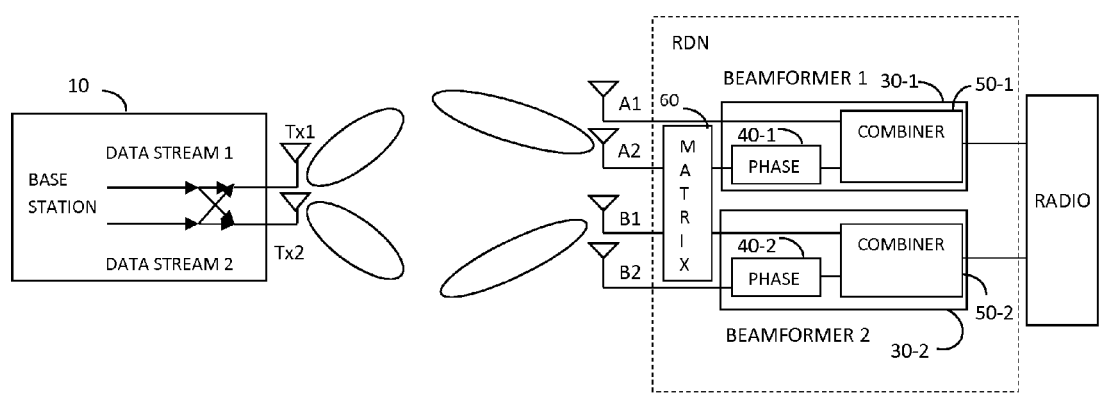
FIG. 3 is a high level block diagram illustrating an exemplary 2×2 MIMO system augmented with an Rx RDN and with a switch matrix for antenna pooling according to another embodiment of the invention.

FIG. 3 shows an exemplary 2×2 MIMO with Rx RDN system capable of antenna pooling. Embodiments of the present invention include a system for setting weights per data-stream in a multiple-input-multiple-output (MIMO). The system may include: a number of receive antennas A1, A2, B1, B2 configured to receive transmitted signals associated with respective data streams transmitted from a base station 10; a number of beamformers 30-1 and 30-2 connected to the receive antennas A1, A2, B1, and B2, configured to combine signals using combiners 50-1 and 50-2 received by the antennas. The system may further include a baseband module coupled to the beamformers via the radio and configured to apply at least one MIMO receiving scheme to the combined signals. The system may further include a control module possibly but not necessarily inside the baseband module configured, inter alia, to: (1) assign each of the receive antennas in each beamformer with a phase that optimizes reception e.g., in interference plus noise (SINR) sense, of at least one of the data streams; (2) compare overall performance of the mapping configurations which map between the beamformers and the data streams (e.g., compare the performance of each configuration to each other); and (3) select the mapping configuration which results in higher SINR measured at the baseband module. For example, the beam created by A1 A2 tuned to maximize data stream 1, beam created by B1 B2 is tuned to maximize data stream 2, and vice versa.

According to some embodiments, the system may provide antenna pooling capability. In a non-limiting exemplary architecture, switch matrix 60 may be configured to pool the antenna A2 and B1 between the two beamformers in order to achieve better performance by selecting a better configuration from antenna phase perspective.

For the full rank MIMO, the Rx RDN can generate the multiple receive beams to further enhance the data streams signal by tuning each receive beam to an individual data stream (beam), respectively. The Rx RDN may then minimize the cross talk and maximize the signal-to-noise ratio for the MIMO system. Combiners 50-1 and 50-2 are to be tuned individually for the two separate data streams.

Following are four embodiments that may be used, either alone or in combination as algorithms of configuration selection.

According to a first embodiment of the present invention, the phases for receive antennae are selected and set such that each beamformer maximizes the received power for one particular data stream (e.g., beamformer 1, 2 . . . and N to maximize the received power for data stream 1, 2, . . . and N, respectively), and select other phases to configure different beamformer-data stream mapping (e.g., beamformer 1, 2, . . . and N maps to data stream N, 1, 2, . . . and N−1, respectively) by using the known pre-coding weight, and channel estimation from "look through".

According to a second embodiment of the present invention, the mapping configuration that maximizes the total received power of all data streams, or maximizes the SINR, may be selected or chosen from the mapping configurations. Phases are then set according to the selected configuration;

According a third embodiment of the present invention, the condition of the transmission matrix for all beamformer-data stream mapping configurations (i.e., cond(transmission matrix), is checked. This condition is defined as the ratio of the maximum singular value to the minimum singular value of the transmission matrix, which represents the uniformity of the channel gains). If all the configurations experience relatively non-uniform channel gains, then the configuration that have the most uniform channel gains (i.e., minimum cond (transmission matrix)) is selected. On the other hand, a pool of configurations that have cond(transmission matrix) all below a pre-set threshold (e.g., 2), may be found. The configuration from the pool that maximizes the total received power of all data streams may be selected from the pool and the phases are set accordingly to optimize the overall performance (e.g., total capacity) for the MIMO system augmented with an Rx RDN.

According to a fourth embodiment of the present invention, the receive antennas may be pooled among beamformers and thus extend the choice of beamformer-data stream mapping configurations for the optimization computation to enhance the aforementioned three embodiments.

In one example, the received signal Y in a MIMO with Rx RDN may be presented in the following formula with the transmitted data streams X and the transmission matrix: $Q*H*W$, $Y=Q*H*W*X$. In the example of 2×2 MIMO augmented by the Rx RDN which has k receive antennas for each receiver, Q is a 2 by (2*k) matrix presenting the phase settings of the Rx antennas in the RDN, H is a (2*k) by 2 matrix, presenting the fading media, and W is a 2 by 2 matrix presenting the pre-coding weights to map the data streams to the transmit antennas and de-correlate the two data streams. It is noted that the pre-coding weight W is known to the receiver either by its feedback (e.g., PMI—Precoding Matrix Indicator) to the transmitter or informed by the transmitter in advanced.

Figure 4:
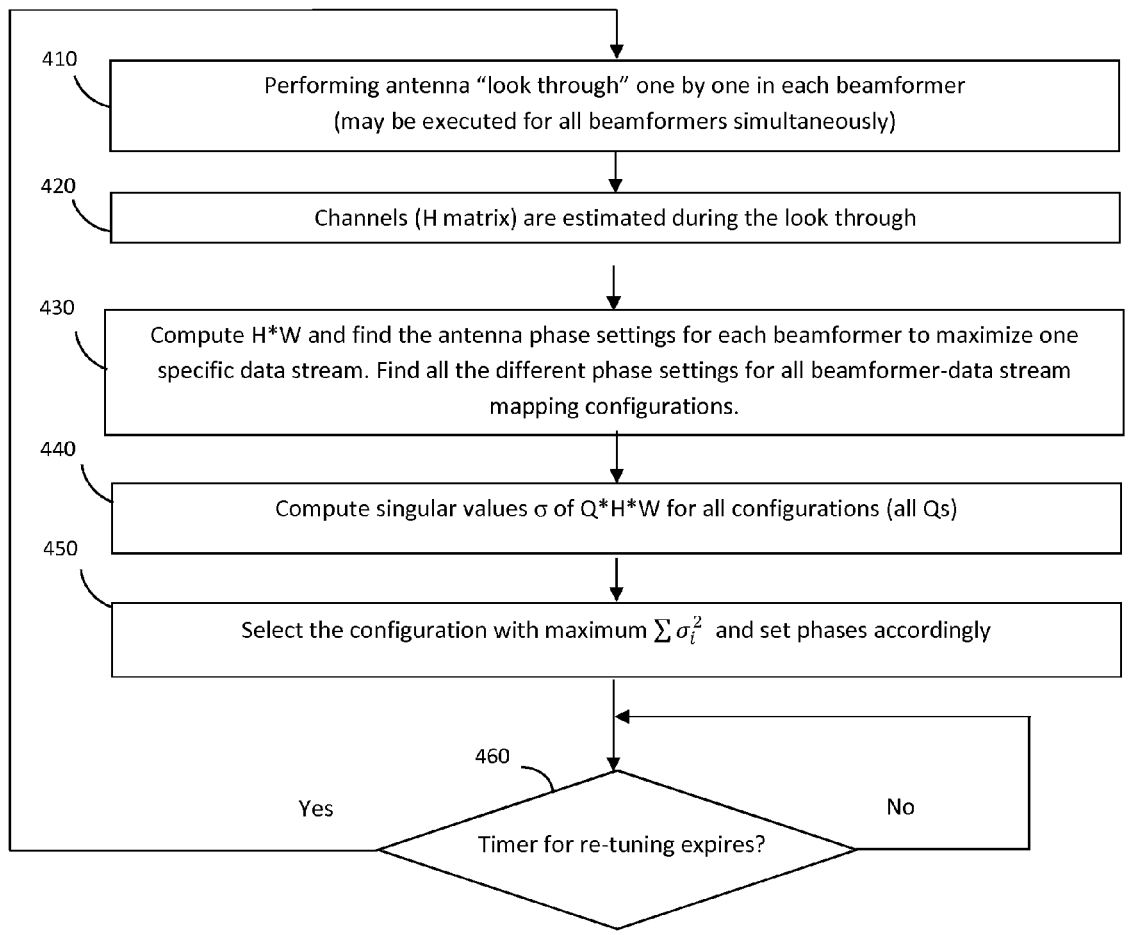
FIG. 4 is a flowchart describing an example procedure to set the phases for rx antennae in beamformer such that one beamformer maximizes the power for one data stream and then select the beamformer-data stream mapping configuration that maximizes the total power of all data streams according to an embodiment of the invention.
Figure 5:
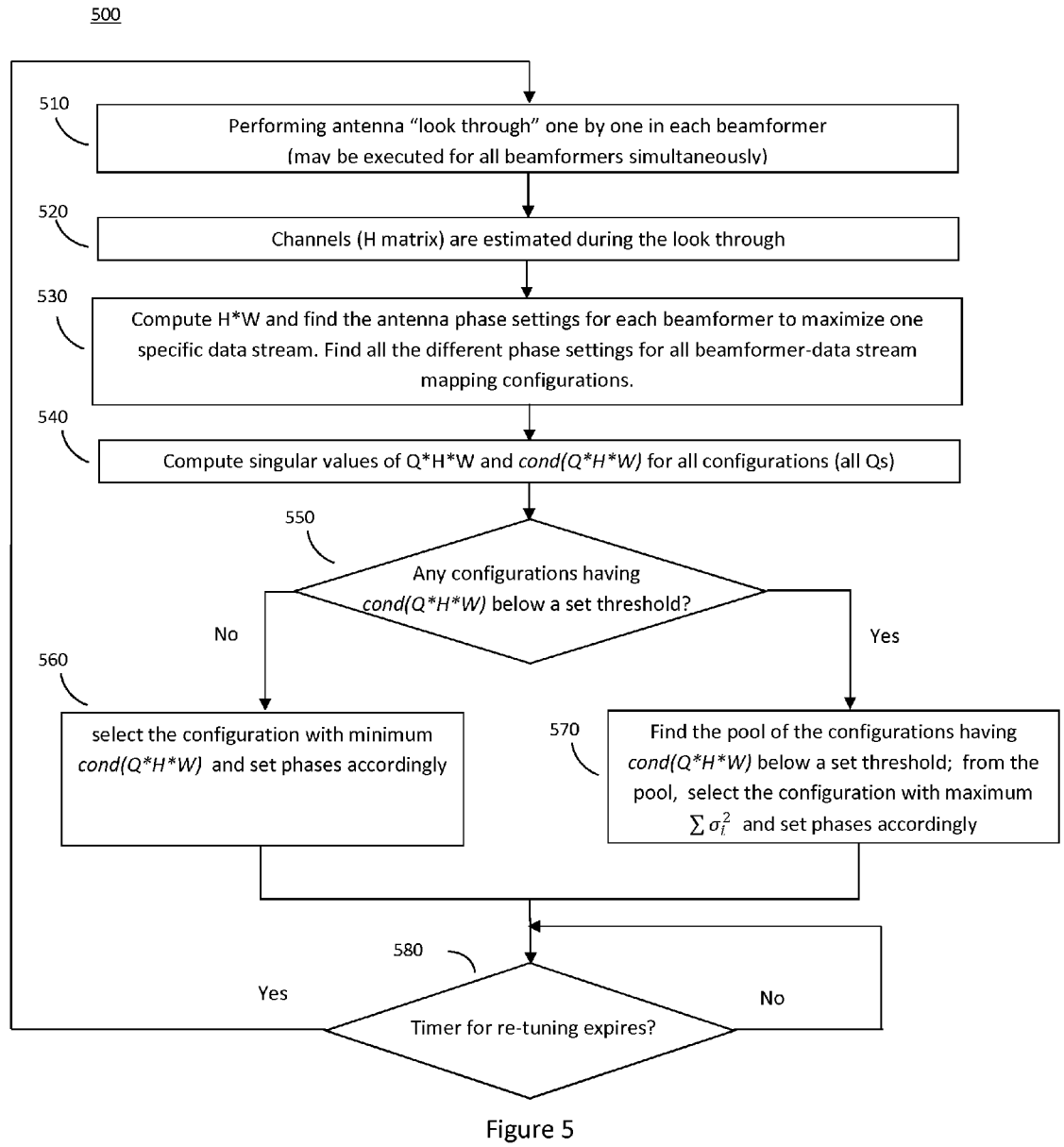
FIG. 5 is a flowchart describing another embodiment of a method for setting set the phases of the receive antennas for each beamformer-data stream mapping configuration and then select the configuration that maximizes the total capacity of the MIMO system augmented with an Rx RDN according to an embodiment of the invention.

FIGS. 4 and 5 show two exemplary procedures for obtaining the phase settings for all Rx antennae so that each beamformer maximizes the received power for a specific data stream and then select the optimal beamformer-data stream mapping configuration and then set the antennas accordingly. In the aforementioned non-limiting example, a case of N plurality of uncorrelated transmit signals projected from a base station, where N=2, is received by a full rank 2×2 MIMO user equipment UE which is augmented by an RDN with 2 beamformers, each beamformer has 2 receive antennas. User equipment ("UE" or "a UE") may be a device such as a cellular telephone, wireless-capable computer or laptop computer, smartphone, or other wireless or cellular capable device.

First, a timer may be set, based on the mobility detection being parameters that determine how the channel changes over time, a time for repeating the optimization process.

The receivers, using the look through method (e.g., one Rx antenna in each beamformer) to carry out channel estimation and obtain the channel information (components of H), shown on the steps of 410 and 420, also on step 510 and 520.

Step 430 (and step 530) shows the computation of $H*W$ and how to obtain the phase setting Q for the receive antennae such that each beamformer maximizes the received power for a specific data stream; and obtain all the phase settings Q's for the different configurations of beamformer-data stream mapping.

In one embodiment of the present invention, the aforementioned computation may include the configurations of antenna pooling. Antennas pooling extends the choices for the match of beamformer to data stream and may result in a better optimization results.

For the exemplary 2×2 hybrid MIMO system, the following formulas and procedures show how to obtain the best phases of Q (matrix) by using the look through method applied sequentially to all the receive antennas in the beamformers. During the look through periods, H is a 2 by 2 matrix, representing the channels between the 2 transmit antennas and 2 receive antennas.

$Y=[y_1, y_2]$ $X=[x_1, x_2]$ $[y_1, y_2]^T = H*W*[x_1, x_2]^T = A[x_1, x_2]^T$

Then $y_1 = (h_{11}w_{11} + h_{12}w_{21})x_1 + (h_{11}w_{12} + h_{12}w_{22})x_2 = a_{11}x_1 + a_{12}x_2$ $y_2 = (h_{21}w_{11} + h_{22}w_{21})x_1 + (h_{21}w_{12} + h_{22}w_{22})x_2 = a_{21}x_1 + a_{22}x_2$ In this example, $a_{11}$ for beamformer 1 may be coherently combined to maximize the received power of data stream 1, and coherently combine a22 for beamformer 2 to maximize the received power of data stream 2. On the other hand, we may coherently combine a12 (a21) for beamformer 1 (2) to maximize the received power of data stream 2 (1). There are two antennas in each beamformer, in this example; hence the phases for the two antennae may be set such that the two $a_{ij}$ are coherently combined. It is noted that all the receivers/beamformers should have a common reference phase (e.g., 360 degrees). The phase of each antenna in beamformer 1 (to maximize data stream 1) can then be set as:

$\Phi_{1i} = 360° - \text{phase}(a_{11})_i = 360° - \text{phase}(h_{11}w_{11} + h_{12}w_{21})_i$, $i=1$ or $2$ In one embodiment, the phase setting for receive antennas may be generalized such that each beamformer maximizes the received power of a specific data stream in the MIMO system augmented with Rx RDN. For Rx antenna i in beamformer j to maximize the received power of data stream n, the phase for the receive antenna can be set as $\Phi_{ji} = \text{common ref. phase (e.g., 360°)} - \text{phase of } (\Sigma_{l=1}^{N} h_{jl}*w_{ln})_i$ n=1, 2 ... N.

"i" indicates the data of h is obtained during the look through using antenna i, "l" indicates transmit antenna, l=1, 2 ... N.

The phase setting Q for each beamformer-data stream mapping configuration can then be created accordingly.

In another embodiment, step 440 shows the step to compute the singular values of the transmission matrix $Q*H*W$ for all Q's (beamformer-data stream mappings).

In another embodiment, selecting the beamformer-data stream mapping configuration for maximizing the total received power of all data streams may be carried out by computing the sum of the squared of these singular values $\Sigma \sigma_i^2$ ($\sigma_i$ is the singular value of $Q*H*W$, i=1 ... N) which represented the overall gain (or relative total received power) for all mapping configurations (i.e., all Q's). The beamformer-data stream mapping configuration may be selected with maximum $\Sigma \sigma_i^2$ and set the phases (Q) accordingly to optimize the MIMO system augmented with an Rx RDN.

According to some embodiments in method 400 pre-set timer is checked in step 460 for re-tuning the Rx RDN. The timer may be set based on UE mobility.

In another embodiment of the invention, flowchart 500 describes another method to select the beamformer-data stream mapping configuration and set phase according to the select configuration for optimizing the hybrid MIMO system. Step 540 shows the step to compute the singular values of the transmission matrix Q*H*W and cond(Q*H*W) for all Q's (beamformer-data stream mappings). cond(Q*H*W) is defined as the ratio of the maximal singular value to the minimal singular value of matrix Q*H*W. The smaller value of cond(Q*H*W) results in more uniform gains for the transmission channels (matrix). cond(Q*H*W)=1 indicates the uniform gain for all data streams. 550 checks the uniformity of channel gains for all the configurations (i.e., if any configuration that have cond(Q*H*W) below a preset threshold (e.g., 2)). If none, the configuration with minimum cond (Q*H*W) is selected, shown in step 560, and the phases are set according to the selected configuration for optimizing the hybrid MIMO system. On the other hand, if a pool (including one) of the configuration(s) with cond(Q*H*W) below the pre-set threshold can be found, step 570 shows the configuration with the maximum $\Sigma \sigma_i^2$ can then be selected and set the receive antenna phases accordingly to optimize the MIMO system augmented with an Rx RDN. The beamformers may be re-tuned, based on the set timer according to mobility in step 580.

In one of the embodiment, the receive antennas connected to the matrix switch may change its connection (e.g., swap or exchange the connections) to a different beamformer to pool the Rx antenna among beamformers. The antenna phases may then be set according to the new antenna pooling configuration. The new antenna configuration with pooling can be included in the optimization process of either aforementioned optimization methods (maximizing total power or optimizing the overall SINR for all data streams). For the case of all antennae can be pooled to any beamformer, there may be up to $M!/(K!)^N$ different beam-former-antennae architectures, assuming each beamformer connect to equal (K) number of antennae. This indicates that it is possible to multiple the beamformer-data stream mapping configurations of a non-pooling-antenna case for the pooling case by a factor of $M!/(K!)^N$. The larger number of configurations increases the computation for the phase settings and may enhance the optimization results.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system comprising:
    a number M receive antennas configured to receive a number N transmitted signals associated with respective data streams;
    a number N beamformers connected to the M receive antennas, configured to combine signals coming from the antennas, wherein M is greater than N, and wherein M and N are integers
    a baseband module coupled to the N beamformers configured to apply at least one multiple input multiple output (MIMO) receiving scheme to the combined signals; and
    a control module configured to: assign each of K receive antennas in each beamformer with a phase/gain that maximizes a received power of at least one of the data streams; wherein K is an integer; compare overall performance of mapping configuration which map between the beamformers and the data streams; and select the mapping configuration which results in higher signal to interference plus noise (SINR) measured at the baseband module, wherein the received power is computed via pre-coding weight and channel estimation through each of the K receive antennas.

2. The system according to claim 1, further comprising a switch matrix configured to swap at least some of the receive antenna connections amongst the beamformers, wherein the beamformers consecutively select a desired combination of K*N antennas from the set antennas wherein each consecutive selection is carried out on the antennas that were not yet selected.

3. The system according to claim 1, wherein the phase settings for the receive antennas is computed for all different beamformer-data stream mapping configurations.

4. The system according to claim 1, wherein the phase/gain settings are carried out at the base band module.

5. A method comprising:
    receiving a number N transmitted signals associated with respective data streams, via M receive antennas connected to a number N beamformers, wherein M is greater than N, and wherein M and N are integers
    assigning each of K receive antennas in each beamformer with a phase/gain that maximizes a received power of at least one of the data streams, wherein K is an integer; wherein the received power is computed via a known pre-coding weight, and channel estimation through each of the K receiving antennas;
    comparing overall performance of mapping configuration which map between the beamformers and the data streams; and
    selecting the mapping configuration which results in higher signal to interference plus noise (SINR) measured at the baseband module.

6. The method according to claim 5, further comprising swapping at least some of the receive antenna connections amongst the beamformers, wherein the beamformers consecutively select a desired combination of K*N antennas from the set antennas wherein each consecutive selection is carried out on the antennas that were not yet selected.

7. The method according to claim 6, wherein at least one different phase/gain settings is computed for at least one specific beamformer-data stream mapping configuration.

8. The method according to claim 5, wherein a beamformer-data stream mapping configuration is selected to maximize the total receive power of all data streams; the phase/gain settings of the selected configuration have the maximum $\Sigma\sigma_i^2$ among all the configurations; $\sigma_i$ is the singular value of transmission matrix: Q*H*W wherein Q denotes phase/gain setting, H denotes a channel matrix, and W denotes pre-coding weight.

9. The method according to claim 5, wherein a beamformer-data stream mapping configuration is selected to have a most uniform channel gain for all the data streams, wherein the phase setting of the selected configuration has a minimum cond(Q*H*W) among all the configurations, wherein cond (Q*H*W) indicates the condition of Matrix Q*H*W, wherein Q denotes phase setting, H denotes a channel matrix, and W denotes pre-coding weight.

10. The method according to claim 5, wherein a pool of beamformer-data stream mapping configurations having relative uniform channel gains for all data streams are selected, wherein the configuration with cond(Q*H*W) below a threshold results in a relative uniform channel gains for all data streams, wherein cond(Q*H*W) indicates the condition of Matrix Q*H*W, wherein Q denotes phase setting, H denotes a channel matrix, and W denotes pre-coding weight.

11. The method according to claim 10, wherein a beamformer-data stream mapping configuration is selected with the maximum $\Sigma\sigma_i^2$ for optimizing the receiving system; wherein $\sigma_i$ is the singular value of transmission matrix: Q*H*W wherein Q denotes phase/gain setting, H denotes a channel matrix, and W denotes pre-coding weight.

12. The method according to claim 5, wherein each receive antenna is connected to any beamformer, wherein a first beamformer selects any desired combination of up to K antennas from the set of M (=K*N) ones, and a next beamformer selects any up to K ones from what is left, till all N beamformers are addressed, wherein said combinations' performance is compared and selected using performance metrics.

* * * * *